United States Patent [19]

Stevens, deceased

[11] 3,966,178
[45] June 29, 1976

[54] COMBINATION GRAIN MILL AND DOUGH MIXER

[75] Inventor: Harold E. Stevens, deceased, late of Brigham City, Utah, by Joan Stevens, heir

[73] Assignee: Mill & Mix Company, Inc., Brigham City, Utah

[22] Filed: Apr. 29, 1974

[21] Appl. No.: 464,793

[52] U.S. Cl. .............................. 259/185; 241/101 B
[51] Int. Cl.² ....................... A21C 1/00; B29B 1/04
[58] Field of Search .............. 259/DIG. 1, 185, 122, 259/DIG. 2, 116, 118, DIG. 7, 99, 102, 104, DIG. 5, DIG. 6; 241/101 R, 101 B, 101.6, 248

[56] References Cited
UNITED STATES PATENTS

| | | | |
|---|---|---|---|
| 250,197 | 11/1881 | Bracher | 241/101 B |
| 1,947,385 | 2/1934 | Fitzgerald | 241/239 |
| 1,963,534 | 6/1934 | Torulf et al. | 259/DIG. 6 |
| 2,072,860 | 3/1937 | Holland | 241/101 B |
| 2,594,399 | 4/1952 | Cornell, Jr. | 259/122 |
| 2,698,144 | 12/1954 | Reiffen | 259/DIG. 6 |
| 3,180,627 | 4/1965 | Belonga | 259/122 |
| 3,688,996 | 9/1972 | Kuest | 241/248 UX |

Primary Examiner—Stanley N. Gilreath
Assistant Examiner—Donald B. Massenberg
Attorney, Agent, or Firm—B. Deon Criddle

[57] ABSTRACT

A combination grain mill and dough mixer arranged so as to be operated by a common power source, that power source preferably being an electric motor having an armature shaft that turns simultaneously both the grain mill and a kneader or agitator portion of the mixer. A preferred form of the grain mill being one utilizing a fixed grinding stone and a stone grinding wheel with flat surfaces of each arranged proximate to one another and the stone wheel adapted to be turned by the shaft of the electric motor, with grain deposited between the stones through an appropriate feed opening formed through the fixed grinding stone.

Grinding of the grain into flour or meal is accomplished by the action of the face of the stone grinding wheel turned closely proximate to the face of the fixed stone, the ground grain falling as flour or meal from between the stones into a drawer within the housing. The flour or meal is then poured, along with other dough ingredients, into a bowl portion of the mixer wherein the kneader or agitator is turned through a bevel gear arrangement connected by a belt to a pulley that is secured to the shaft of the electric motor.

8 Claims, 4 Drawing Figures

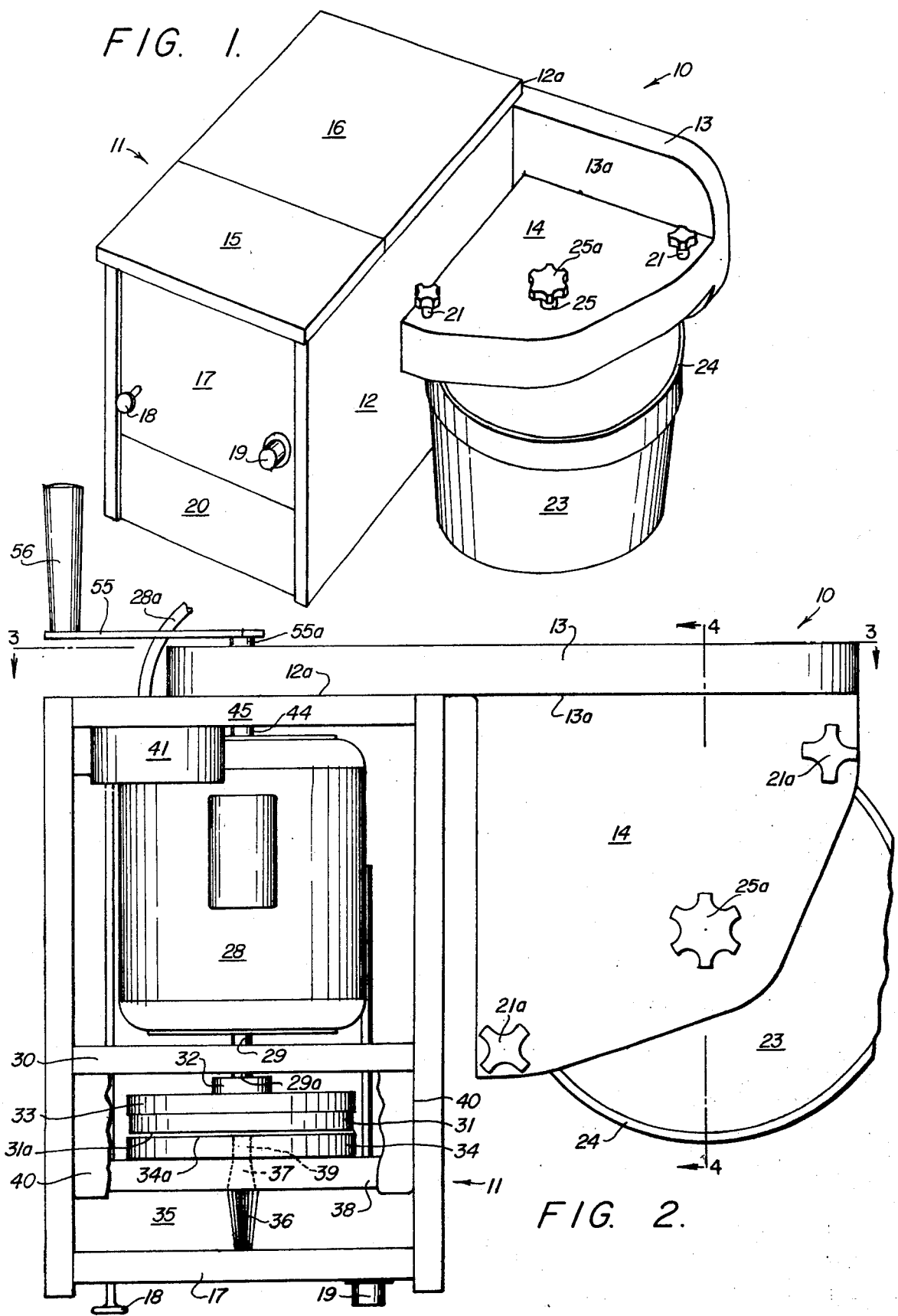

COMBINATION GRAIN MILL AND DOUGH MIXER

BRIEF DESCRIPTION OF THE INVENTION

1. Field of the Invention

This invention relates to a combination grain mill and dough mixing device that utilizes one power source to drive both mill and mixer.

2. Prior Art

While certainly mixers incorporating a kneader or agitator turned in a container are not new, nor is a grain mill incorporating, respectively, stationary and rotating grinding stones, facing one another and spaced to grind grain therebetween, which rotating stone may be turned by an electric motor. The combination, however, of such a grain mill and mixer, each driven simultaneously by a single power source, is, however, heretofore unknown.

While no device within the inventor's knowledge is similar to the present invention, certain prior devices, such as those shown in U.S. Pat. Nos. 1,418,108, 1,947,385, and 3,283,792, have, respectively, involved a food machine that uses interchangeable tools to perform whipping, beating, grating, and grinding functions; a grinder attachment for a mixer; and a grinding and whipping apparatus. None, heretofore discovered, however, has shown a combination like that of the present invention involving both a mill and mixer that can be used simultaneously, without the necessity of removal and installation of attachment. The present invention incorporates, therefore, known mixer and mill arrangements in a unique fashion so as to be driven, simultaneously, by a single power source.

SUMMARY OF THE INVENTION

It is a principal object of the present invention to provide a combination of a grain mill and dough mixer operated simultaneously by a single power source.

Another object of the present invention is to provide a power transfer arrangement for the grain mill and dough mixer whereby a single power source is connected to turn a grinder portion of the mill at one speed of rotation while a kneader or agitator portion of the mixer is turned at a lesser speed.

Still another object of the present invention is to provide a housing arrangement wherein the power source and grain mill are arranged and dough mixer is connected having, as part thereof, means for releasibly coupling a continuous portion to the mixer.

Principal features of the present invention include a housing containing a power source, preferably an electric motor, therein. Switch and electric motor positioning means are arranged on the outside of said housing, on a face thereof. Across a forward end of an armature shaft that extends from both ends of the electric motor is centrally connected a stone grinding wheel, a flat face thereof being proximate to a face of a like grinding stone that is fixed within the housing. The fixed grinding stone has a hole formed therethrough for passing grain to between said stone grinding wheel and fixed grinding stone that is ground into flour or meal by the turning of the stone wheel over the fixed stone. Such ground grain falls from between the stones into a drawer arranged in the housing. The flour or meal so collected can then be poured into a container of the dough mixer.

The dough mixer is also powered by the electric motor, driven from the armature shaft end that extends from the rear of that electric motor. The shaft end connects to a small pulley that turns, through a belt, a larger pulley effecting a speed reduction therebetween, which large pulley attaches to a shaft which is, in turn, journaled through the housing and connecting to a ninety degree bevel gear arrangement to turn an off-center end of a kneader or agitator. So arranged, with the electric motor operating, the kneader or agitator will turn within a mixer bucket or pail such that the flour or meal poured therein will be mixed with other ingredients into a ball of dough. Thereafter, the connection means holding the container can be released and the container lowered away from the kneader or agitator.

Further objects and features of the invention will become apparent from the following detailed description, taken together with the accompanying drawings.

THE DRAWINGS

FIG. 1 is a profile perspective view of a combination grain mill and dough mixer of the present invention;

FIG. 2, a top plan view of the grain mill and dough mixer of FIG. 1 having top access doors thereof removed to expose the grain mill interior and showing also a mid portion of a plate therein broken away;

FIG. 3, a rear elevation view of the combination grain mill and dough mixer of FIG. 1, an outer cover of a drive arrangement shroud having been removed therefrom to expose a belt and pulley arrangement for driving the dough mixer; and FIG. 4, a profile sectional view of the dough mixer portion of the invention taken along the line 4—4 of FIG. 3, exposing a drive pulley and ninety degree bevel gear arrangement connected thereto for turning a kneader or agitator of the mixer.

DETAILED DESCRIPTION

Figure 3:
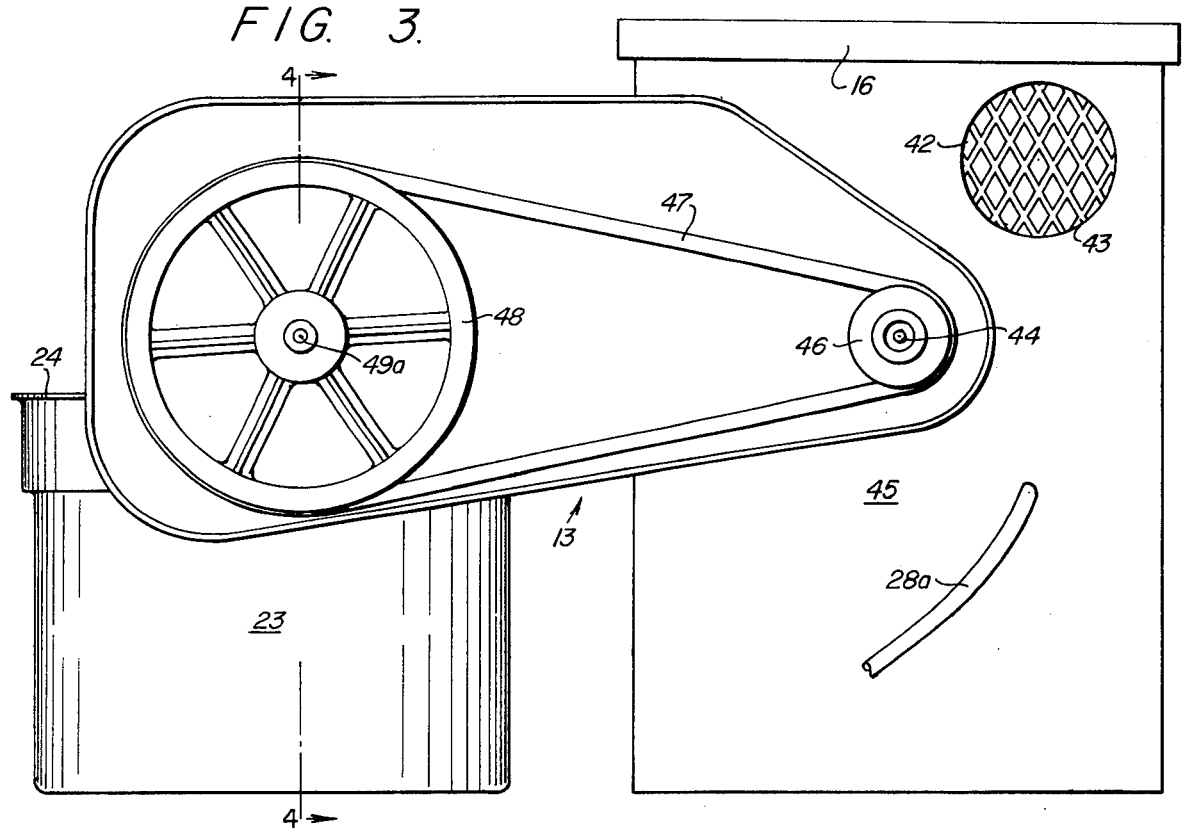

Referring now to the drawings:

Shown best in FIG. 1, the present invention is a combination grain mill and dough mixer, hereinafter referred to as mill and mixer 10. Therein the mill and mixer 10 is shown consisting of a box shaped housing 11, out from one side 12 thereof, along a rear edge 12a, a shroud 13 extends at a normal angle and connects at a front wall 13a to a mixer mounting plate 14 extending from across the housing wall 12, standing outwardly at a normal angle therefrom.

The housing 11, shown best in FIG. 1 has front and rear access lids 15 and 16 respectively, hereinafter referred to as lids, arranged over and forming the top thereof, which lids 15 and 16 are shown removed in FIG. 2 to expose the components within the interior of the housing. Arranged on a front panel 17 of the housing 11 is shown in FIG. 1, knobs 18 and 19, and the outline of the drawer 20. The knobs 18 and 19, respectively, provide a means for turning on an electric motor, to be described later herein as the power source for the invention, and as a means for controlling spacing between a grinding portion of the invention, to be described in detail later herein. The drawer 20 is fitted to slide freely into and out of the housing 11, and, when installed therein, is directly below the above mentioned grinding portion, receiving flour or meal falling therefrom.

Shown in FIG. 1, mixer pail lug bolts 21 are arranged to extend outwardly from spaced locations, which pail lug bolts are hereinafter referred to as bolts 21. The bolts 21, shown best in FIG. 4, each extend through the mixer mounting plate 14, and are fitted through cam lug nuts 22, hereinafter referred to as nuts 22. Shown best in FIG. 4, an operator, not shown, can manually turn heads 21a of the bolts 21 so as to raise or lower the nuts 22, which nuts are arranged to recive thereunder a lip 24 of a pail 23. The operator, by first turning the bolt heads 21 so as to loose each bolt 21, can thereafter fit the pail lip 24 thereunder and, by turning oppositely the bolt heads 21a can elevate each nut 22 so as to bind the pail lip between that nut 22 and an undersurface 14a of the mixer mounting plate 14. By appropriately turning the bolts 21 an operator can thereby mount the pail 23 to the mixer mounting plate 14, or can release it therefrom. In addition to the bolt heads 21a, a spindle bolt 25, shown in FIGS. 1 and 2, extends from the mixer mounting plate 14 and is for securing, by appropriately turning of a head portion 25a thereof, a mixer bevel gear 26 within the mixer mounting plate 14. Shown in FIG. 4, the bevel gear 26 mounts a kneader or agitator blade 27, hereinafter referred to as blade, extending therefrom, the operation of which bevel gear 26 and blade 27 will be explained in detail later herein.

In FIG. 2, the housing lids 15 and 16 are shown removed to expose a top view of the interior of the housing 11. Contained therein is shown an electric motor 28 having the front end of an armature shaft 29 extending therefrom that is journaled through a housing interior wall 30. On the shaft end 29, opposite to motor 28, is arranged so as to rotate therewith, a stone grinding wheel 31. A collar 32 is provided to receive the tip 29a of the shaft end 29, which collar is secured across a mid portion of a plate 33 to which plate 33 the stone grinding wheel 31 is secured, such that, when the shaft end 29 is turned by the electric motor 28, the plate and stone grinding wheel are also turned therewith. Exactly opposite to a flat face 31a of the stone grinding wheel is arranged a flat face 34a of a fixed grinding stone 34. The stone grinding wheel 31, when the electric motor 28 is turned on by energizing switch 18, electric power flows thereto through a cable 28a, FIGS. 2 and 3, flat face 31a thereof turns proximate to the flat face 34a of the fixed grinding stone 34. Grain, such as wheat, introduced between the flat faces 31a and 34a will thereby be ground into flour or meal, falling therefrom, as has already been mentioned, into the drawer 20. Grain for introduction between the grinding stones, as shown in FIG. 2, is poured into a tray 35 in the housing 11 falling into a trough 36 that connects to an opening 37 formed through a housing wall 38 and connecting to a hole 39 formed through the fixed grinding stone 34. The grain thereby passes into between the grinding stone faces 31a and 34a. Both opening 37 and hole 39 are formed through the housing divider wall 38 and fixed grinding stone 34 respectively and are shown therein as broken lines.

A cover 40, shown in FIG. 2 with the center thereof broken away to expose the fixed grinding stone and wheel therebelow, is arranged within the housing 11 so as to slant downwardly towards the tray 35, grain falling thereon sliding into the tray and thence, as described above, into the trough 36. Cover 40 provides also a covering for the respective stationary grinding stone and stone grinding wheel.

Shown as a block 41 in FIG. 2, the present invention preferably involves a fan therewith, which fan exhausts dust and the like from within the housing 11, through an opening 42 formed in a housing rear wall 45 and shown in FIG. 3 as having a screen 43 fitted thereover.

Opposite to the shaft end 29, extending from the front of the electric motor is the opposite armature shaft end identified herein as shaft end 44. The shaft end 44 is, in turn, journaled through a rear wall 45 of the housing 11, FIG. 2, and has a small diameter pulley 46, FIG. 3, secured across the end thereof. The pulley 46 has a belt 47 arranged thereover, turning within the shroud 13, that belt traveling over, to turn also, a larger pulley 48. As the power transfer is between pulleys of different size, the smaller pulley 46 being the driver pulley and the larger pulley 48 being the driven pulley, this arrangement effects a speed reduction between the electric motor and large pulley. The dough mixer portion of the present invention is connected ultimately to the larger pulley and is therefore operated to a slower speed than is the grain mill portion.

Figure 4:
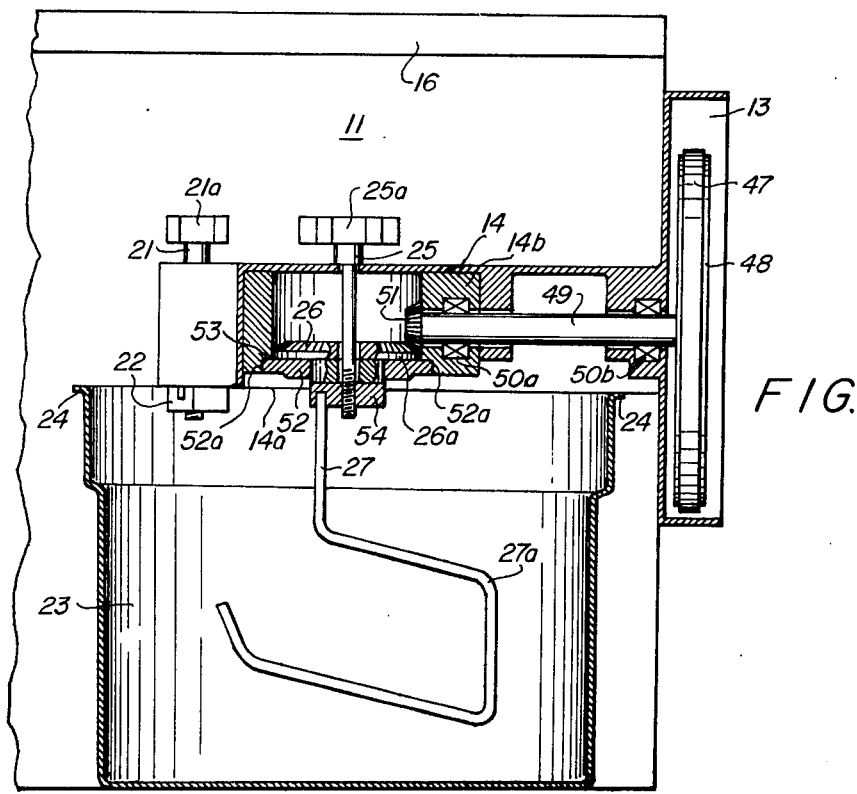

The larger pulley 48, as mentioned above, is turned by the smaller pulley 46, and is connected to an end 49a of a shaft 49, FIG. 4. The shaft 49 is journaled on bearings 50a and 50b through a rear wall 14a of the mixer mounting plate 14, and through a center partition 14b respectively. On the end of the shaft 49, opposite to the pulley 48, is arranged a bevel pinion gear 51 that meshes, in a ninety degree relationship, with the already mentioned bevel gear 26. So arranged, when the pulley 48 is turned, it turns also the shaft 49 and pinion bevel gear 51 that, in turn, rotates the bevel gear 26 to turn the blade 27. The blade 27 is formed, as shown in FIG. 4, into a hook 27a opposite to its connection to bevel gear 26 to facilitate kneading and mixing meal or flour from the mill, with other additives, into dough.

As stated earlier herein the spindle bolt 25 is installed through the bevel gear 26 to maintain that gear aligned within the mixer mounting plate 14. Alignment of the bevel gear 26 is also accomplished by installing a plate 52 below the bevel gear such that edges 52a thereof fit into notches 53 formed across from one another in the center partition 14b and a front wall 14c of the mixer mounting plate 14. Below the plate 52, as shown also in FIG. 4, and turned onto a threaded end of the spindle bolt 25 is arranged a nut 54. The nut 54 holds the bevel gear 26 aligned within the mixer mounting plate 14 and in engagement with the pinion bevel gear 51. The nut 54 is, of course, arranged with a smooth surface for engagement with the bevel gear base 26a so as to minimize friction therebetween while remaining in a lock attitude on the spindle bolt end.

As has already been mentioned herein, the component mill and mixer portions of the combination of the present invention are operated simultaneously by the operation of the electric motor 28, but at different speeds of turning with the power transfer between the smaller pulley 46 and larger pulley 48 effecting a speed reduction therebetween.

Knob 19, as already mentioned herein, is preferably intended to connect to a means for adjusting the spacing between the stone grinding wheel 31 and the fixed grinding stone 34 by adjusting the positioning of electric motor 28 within the housing 11. This spacing adjustment arrangement is preferably like that shown in my co-pending application for U.S. Pat. Ser. No. 464,794, filed on Apr. 29, 1974, and will not be described in detail herein, it being understood that the present invention involves some means for adjusting spacing between the turning and fixed grinding stones, and for separating the two mutually opposing faces of the stones to reduce friction between the stones, as when the mixer is utilized alone.

Shown in FIG. 2, a crank 55 is preferably included as part of the invention, one end 55a of which crank is arranged for installation into the end of the shaft 44. Thereafter, by turning a handle 56, in the opposite crank end, the armature shaft and shaft ends 29 and 44 can be turned opposite to the usual direction of rotation of the electric motor 28 armature shaft. Such opposite turning allows an operator, not shown, to dislodge materials that have become stuck between the stone grinding wheel 31 and fixed grinding stone 34, such that the stone grinding wheel can thereafter turn freely.

Although a preferred embodiment of the invention has been herein described, it is to be understood that the present disclosure is made by way of example and that variations are possible without departing from the subject matter coming within the scope of the following claims, which subject matter should be regarded as embracing the invention.

I claim:

1. A combination grain mill and dough mixer comprising
   a housing having side walls, a front wall, a rear wall, a top wall and a bottom wall;
   a power source arranged in said housing producing a rotary output from a shaft thereof;
   a stone grinding wheel attached to said shaft so as to turn therewith;
   a fixed gringing stone, secured within said housing so as to be proximate to said grinding wheel, with grinding faces of each extending parallel to and mutually opposite to one another;
   means disposed below said stone grinding wheel and and fixed grinding stone, for receiving meal falling from between said stone grinding wheel and fixed grinding stone;
   means for feeding grain between said stone grinding wheel and fixed grinding stone;
   means connected to said shaft for transferring power therefrom to a dough mixer;
   mixer mounting means extending from a side wall of said housing on which said dough mixer is mounted said mixer mounting means comprising a mixer mounting plate extending as a shelf outwardly from said side wall and at a spaced distance above the bottom wall of said housing;
   an agitator blade rotated by said power transfer means, and clamping means carried by the mixer mounting means; and
   container means having a periphery arranged to be releasibly attached beneath and to be immovably clamped to said mixer mounting plate by said clamping means, with the agitator blade therein, whereby the blade can be rotated and dough mixed in the container means.

2. A combination grain mill and dough mixer as recited in claim 1, wherein
   the power source consists of an electric motor, and said shaft portion of said power source is the armature of said electric motor that is arranged such that the ends thereof extend from opposite ends of said electric motor.

3. A combination grain mill and dough mixer as recited in claim 1, wherein the means for transferring power for the electric motor to the dough mixer consists of
   a pulley connected to the end of said shaft opposite to said grinding wheel;
   a gearing arrangement carried by said mixer mounting plate;
   a shaft extended from said gearing arrangement;
   a pulley secured to said shaft opposite to said gearing arrangement; and
   drive belt means arranged between said respective pulleys.

4. A combination grain mill and dough mixer as recited in claim 3, wherein
   said gear arrangement consists of a bevel pinion gear meshing, at a ninety degree angle with a second bevel gear effecting thereby a ninety degree transmission of rotary motion between said shaft and said agitator blade that extends from and is turned by said bevel gear.

5. A combination grain mill and dough mixer as recited in claim 1, wherein
   the power source consists of an electric motor, and said shaft portion of said power source is the armature of said electric motor that is arranged such that the ends thereof extend from opposite ends of said electric motor.

6. A combination grain mill and dough mixer as recited in claim 5, wherein
   the means connected to said shaft for transferring power therefrom to a dough mixer includes drive means within the cover means extending outwardly from the rear wall of the housing.

7. A combination grain mill and dough mixer comprising
   a housing having side walls, a front wall, a rear wall, a top wall and a bottom wall;
   a power source arranged in said housing producing a rotary output from a shaft thereof;
   a stone grinding wheel attached to said shaft so as to turn therewith;
   a fixed grinding stone, secured within said housing so as to be proximate to said grinding wheel, with grinding faces of each extending parallel to and mutually opposite to one another;
   means disposed below said stone grinding wheel and fixed grinding stone, for receiving meal falling from between said stone grinding wheel and fixed grinding stone;
   means for feeding grain between said stone grinding wheel and fixed grinding stone;
   means connected to said shaft for transferring power therefrom to a dough mixer;
   mixer mounting means at least partially extending from a side wall of said housing on which said dough mixer is mounted, said mixer mounting means including a mixer mounting member extending outwardly from said side wall at a spaced distance above the bottom wall of said housing;
   an agitator blade rotated by said power transfer means;
   clamping means adapted to be attached to the mixer mounting means; and
   container means having a periphery arranged to be releasably attached to and to be immovably clamped to said mixer mounting member so as to be positioned therebelow with the agitator blade therein, whereby the blade can be rotated and dough mixed in said container means.

8. A combination grain mill and dough mixer as recited in claim 7, further including
   cover means for the means connected to the shaft of the power source for transferring power therefrom to a dough mixer, said cover means including a front wall extending outwardly from the rear wall of the housing; and wherein
   the mixer mounting means includes a portion fixed to and carried by said front wall of said cover means.

* * * * *